(12) United States Patent
Aimi

(10) Patent No.: US 10,346,127 B2
(45) Date of Patent: Jul. 9, 2019

(54) OPERATION PROCESSING DEVICE, REPRODUCING DEVICE, AND OPERATION PROCESSING METHOD

(71) Applicant: CASIO COMPUTER CO., LTD., Shibuya-ku, Tokyo (JP)

(72) Inventor: Hideaki Aimi, Hamura (JP)

(73) Assignee: CASIO COMPUTER CO., LTD., Tokyo (JP)

(*) Notice: Subject to any disclaimer, the term of this patent is extended or adjusted under 35 U.S.C. 154(b) by 0 days.

(21) Appl. No.: 15/901,260

(22) Filed: Feb. 21, 2018

(65) Prior Publication Data
US 2018/0275952 A1    Sep. 27, 2018

(30) Foreign Application Priority Data
Mar. 22, 2017   (JP) .................................. 2017-056545

(51) Int. Cl.
*G06F 3/16* (2006.01)
*H04H 60/04* (2008.01)

(52) U.S. Cl.
CPC .............. *G06F 3/165* (2013.01); *H04H 60/04* (2013.01)

(58) Field of Classification Search
CPC ........... G06F 3/165; G06F 3/162; G10H 1/18; G10H 1/0091; G10H 1/02; G10H 1/348; G10H 1/386; H04H 60/04
USPC ....... 84/622, 625, 602, 454, 626; 340/407.1; 345/8, 619; 358/1.1; 361/679.58; 369/91; 381/119, 17, 61; 455/518, 3.06; 324/207.12; 348/373; 396/87; 700/94, 700/1; 715/716, 761, 781; 327/385; 704/278, 500
See application file for complete search history.

(56) References Cited

U.S. PATENT DOCUMENTS

| | | | | |
|---|---|---|---|---|
| 4,560,983 A | * | 12/1985 | Williams | ............. G05B 19/108 340/407.1 |
| 4,998,960 A | * | 3/1991 | Rose | .................... G10H 1/0008 84/602 |

(Continued)

FOREIGN PATENT DOCUMENTS

| | | |
|---|---|---|
| JP | 2002169547 A | 6/2002 |
| JP | 2003295861 A | 10/2003 |

(Continued)

OTHER PUBLICATIONS

Japanese Office Action (and English language translation thereof) dated Jan. 25, 2018 issued in counterpart Japanese Application No. 2017-056545.

*Primary Examiner* — Gerald Gauthier
(74) *Attorney, Agent, or Firm* — Holtz, Holtz & Volek PC

(57) ABSTRACT

An operation processing device comprises: an operator which is capable of operating of changing a designation position and outputs an operation value corresponding to the designation position; and a processor which determines each of a plurality of execution conditions corresponding to each of a plurality of processes according to the operation value output by the operator and controls execution of the plurality of processes on the basis of a correspondence relation between the operation value and the execution condition which is defined to be individually different in each process and controls performing of the plurality of processes on the basis of the respective determined execution conditions.

13 Claims, 5 Drawing Sheets

(56) References Cited

U.S. PATENT DOCUMENTS

| | | | | |
|---|---|---|---|---|
| 5,451,976 A * | 9/1995 | Ito | ............ | G02B 27/017 345/8 |
| 6,061,458 A * | 5/2000 | East | ............ | H04H 60/04 381/119 |
| 9,318,086 B1 * | 4/2016 | Miller | ............ | G10H 1/02 |
| 9,728,172 B1 * | 8/2017 | Perez | ............ | G10H 1/18 |
| 2002/0159375 A1 * | 10/2002 | Eguchi | ............ | G10H 1/0041 369/91 |
| 2003/0052728 A1 * | 3/2003 | Philpott | ............ | G10H 3/186 327/385 |
| 2004/0267541 A1 * | 12/2004 | Hamalainen | ............ | G10H 1/0066 704/278 |
| 2006/0158667 A1 * | 7/2006 | Otani | ............ | G06K 15/00 358/1.1 |
| 2006/0210098 A1 * | 9/2006 | Okabayashi | ............ | H04H 60/04 381/119 |
| 2007/0015457 A1 * | 1/2007 | Krampf | ............ | H03J 1/0025 455/3.06 |
| 2007/0100482 A1 * | 5/2007 | Cotey | ............ | H04H 60/04 700/94 |
| 2008/0046098 A1 * | 2/2008 | Corbin | ............ | G10H 1/0091 700/1 |
| 2008/0072739 A1 * | 3/2008 | Ueno | ............ | G10G 7/02 84/454 |
| 2008/0175415 A1 * | 7/2008 | Kunimoto | ............ | G11B 27/034 381/119 |
| 2008/0288876 A1 * | 11/2008 | Fleming | ............ | G06F 3/167 715/761 |
| 2009/0019996 A1 * | 1/2009 | Fujishima | ............ | G10H 1/0025 84/625 |
| 2009/0178546 A1 * | 7/2009 | Watanabe | ............ | G10H 1/0091 84/626 |
| 2010/0030563 A1 * | 2/2010 | Uhle | ............ | G10L 19/008 704/500 |
| 2010/0085379 A1 * | 4/2010 | Hishikawa | ............ | G06F 3/017 345/619 |
| 2011/0033057 A1 * | 2/2011 | Gallo | ............ | G10H 1/0091 381/61 |
| 2011/0182031 A1 * | 7/2011 | Ohnishi | ............ | G03G 21/1685 361/679.58 |
| 2013/0108057 A1 * | 5/2013 | Yuyama | ............ | H04S 3/002 381/17 |
| 2014/0178058 A1 * | 6/2014 | Sasaki | ............ | G01D 5/244 396/87 |
| 2015/0268921 A1 * | 9/2015 | Georges | ............ | G05B 15/02 700/94 |
| 2016/0019875 A1 * | 1/2016 | Moriyama | ............ | G10H 1/0091 84/602 |
| 2016/0057321 A1 * | 2/2016 | Yamaura | ............ | H04N 5/2251 348/373 |
| 2016/0070275 A1 * | 3/2016 | Anderson | ............ | G06F 3/165 700/94 |
| 2016/0135018 A1 * | 5/2016 | Congdon, Jr. | ............ | H04W 4/10 455/518 |
| 2016/0139788 A1 * | 5/2016 | Nishikori | ............ | G11B 27/34 715/716 |
| 2016/0142164 A1 * | 5/2016 | Nishikori | ............ | G06F 3/165 381/119 |
| 2016/0146638 A1 * | 5/2016 | Dixon | ............ | G01D 5/142 324/207.12 |
| 2016/0170593 A1 * | 6/2016 | Lehtiniemi | ............ | G06F 3/041 715/781 |
| 2016/0283187 A1 * | 9/2016 | Yamamoto | ............ | H04H 60/04 |
| 2017/0025105 A1 * | 1/2017 | Ou | ............ | G10H 1/0091 |
| 2017/0109125 A1 * | 4/2017 | Fang | ............ | G06F 3/162 |
| 2017/0109127 A1 * | 4/2017 | Osborn | ............ | G10H 1/0058 |
| 2017/0263231 A1 * | 9/2017 | Fan | ............ | G10H 1/342 |
| 2017/0264385 A1 * | 9/2017 | Anderson | ............ | H04H 60/04 |
| 2017/0277509 A1 * | 9/2017 | Oyamatsu | ............ | G06F 3/04847 |
| 2018/0144731 A1 * | 5/2018 | McHale | ............ | G10H 1/348 |
| 2018/0275952 A1 * | 9/2018 | Aimi | ............ | G06F 3/165 |

FOREIGN PATENT DOCUMENTS

| | | |
|---|---|---|
| JP | 2005252543 A | 9/2005 |
| JP | 2010181723 A | 8/2010 |
| JP | 2016180947 A | 10/2016 |

* cited by examiner

FIG. 3

CONTROL PARAMETER TABLE CT

| | OPERATION VALUE (0 TO 5) OFF (DESIGNATED REGION 0) | OPERATION VALUE (6 TO 24) MODE-1 (DESIGNATED REGION 1) | OPERATION VALUE (25 TO 63) MODE-2 (DESIGNATED REGION 2) | OPERATION VALUE (64 TO 103) MODE-3 (DESIGNATED REGION 3) | OPERATION VALUE (104 TO 126) MODE-4 (DESIGNATED REGION 4) | OPERATION VALUE (127) MAX (DESIGNATED REGION 5) |
|---|---|---|---|---|---|---|
| MUSIC DATA | OFF | 1 PHRASE LOOP REPRODUCTION | 1/2 PHRASE LOOP REPRODUCTION | 1/4 PHRASE LOOP REPRODUCTION | 1/8 PHRASE LOOP REPRODUCTION | ROLL SOUND CUT |
| BUILT-IN SOUND EFFECT | OFF | ⇧ RANDOMLY REPRODUCE SURROUNDING SOUND, SOUND EFFECT, AND THE LIKE | | | | |
| USER SAMPLING SOUND | OFF | ⇧ CERTAIN LENGTH OF MATERIAL SOUND IS LOOP-REPRODUCED | | | | |
| OPTICAL PERFORMANCE PATTERN | OFF | OPTICAL PERFORMANCE OF OPTICAL PERFORMANCE PATTERN 1 | OPTICAL PERFORMANCE OF OPTICAL PERFORMANCE PATTERN 2 | OPTICAL PERFORMANCE OF OPTICAL PERFORMANCE PATTERN 3 | OPTICAL PERFORMANCE OF OPTICAL PERFORMANCE PATTERN 4 | OPTICAL PERFORMANCE OF OPTICAL PERFORMANCE PATTERN 5 |

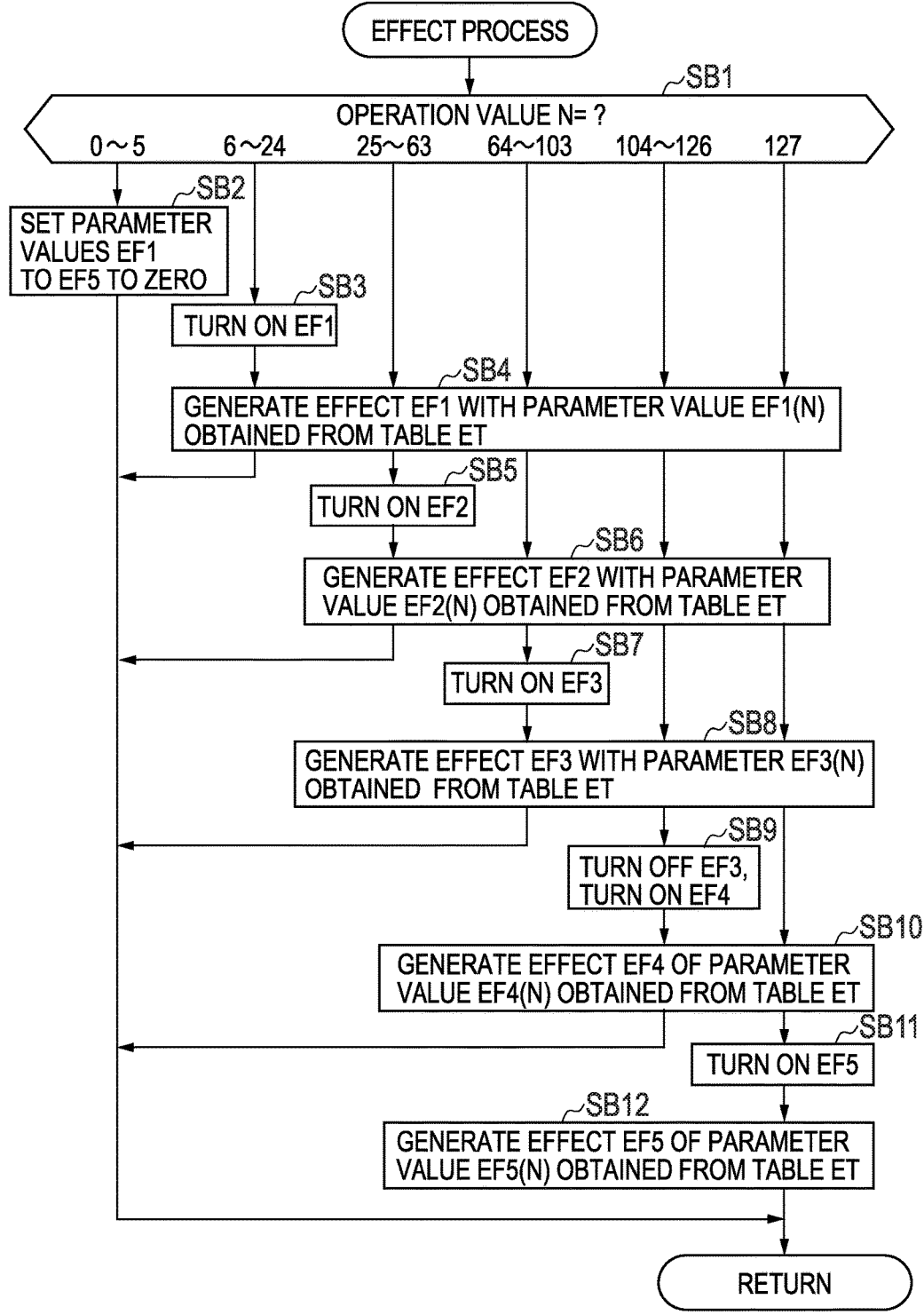

OPERATION PROCESSING DEVICE, REPRODUCING DEVICE, AND OPERATION PROCESSING METHOD

CROSS-REFERENCE TO RELATED APPLICATIONS

The entire contents of JP Patent Application No. 2017-056545, filed on Mar. 22, 2017 are incorporated in the present specification by reference.

BACKGROUND OF THE INVENTION

1. Field of the Invention

The present invention relates to an operation processing device, a reproducing device, and an operation processing method to control execution of a plurality of processes by an operator.

2. Description of the Related Art

There is known a reproducing device in which music data indicating pitches and sounding timing of musical notes composing music is stored in a memory for each of a plurality of tracks in correspondence with a musical instrument part, and the music data of each track stored in the memory is sequentially read out and reproduced (automatically played) in synchronization with a tempo of the music. As an example of such type of device, JP 2002-169547 A discloses a technique of reproducing music data in which drum sounds and non-drum sounds are mixed in one track.

In addition, besides such a reproducing device, there is known an operation processing device which controls execution of a plurality of processes by an operator.

SUMMARY OF THE INVENTION

An aspect of a present invention is summarized as an operation processing device, comprising: an operator which is capable of operating of changing a designation position and outputs an operation value corresponding to the designation position; and a processor which determines each of a plurality of execution conditions corresponding to each of a plurality of processes according to the operation value output by the operator and controls execution of the plurality of processes on the basis of the determined execution conditions, wherein the processor performs the determination on the basis of a correspondence relation between the operation value and the execution condition which is defined to be individually different in each of the plurality of processes.

In addition, other aspect of the present invention is summarized as an operation processing method which causes a device to perform: acquiring an operation value according to a position which is designated by a designation operation of an operator; determining, according to the acquired operation value, an execution condition corresponding to each of a plurality of processes on the basis of a correspondence relation between the operation value and the execution condition which is defined to be individually different in each process; and controlling the performing of the plurality of processes on the basis of the respective determined execution conditions.

In addition, other aspect of the present invention is summarized as a non-transitory recording medium having stored a program for causing a computer to execute a process of: acquiring an operation value according to a position which is designated by a designation operation of an operator; determining, according to the acquired operation value, an execution condition corresponding to each of a plurality of processes on the basis of a correspondence relation between the operation value and the execution condition which is defined to be individually different in each process; and controlling the performing of the plurality of processes on the basis of the respective determined execution conditions.

BRIEF DESCRIPTION OF THE DRAWING

FIG. 3 is a diagram illustrating an example of a control parameter table CT;

FIG. 5 is a flowchart illustrating operations of an effect process executed by the CPU 13.

DETAILED DESCRIPTION OF THE PREFERRED EMBODIMENTS

Hereinafter, embodiments of the invention will be described with reference to the drawings.

A. External Appearance and Configurations

Figure 1A:
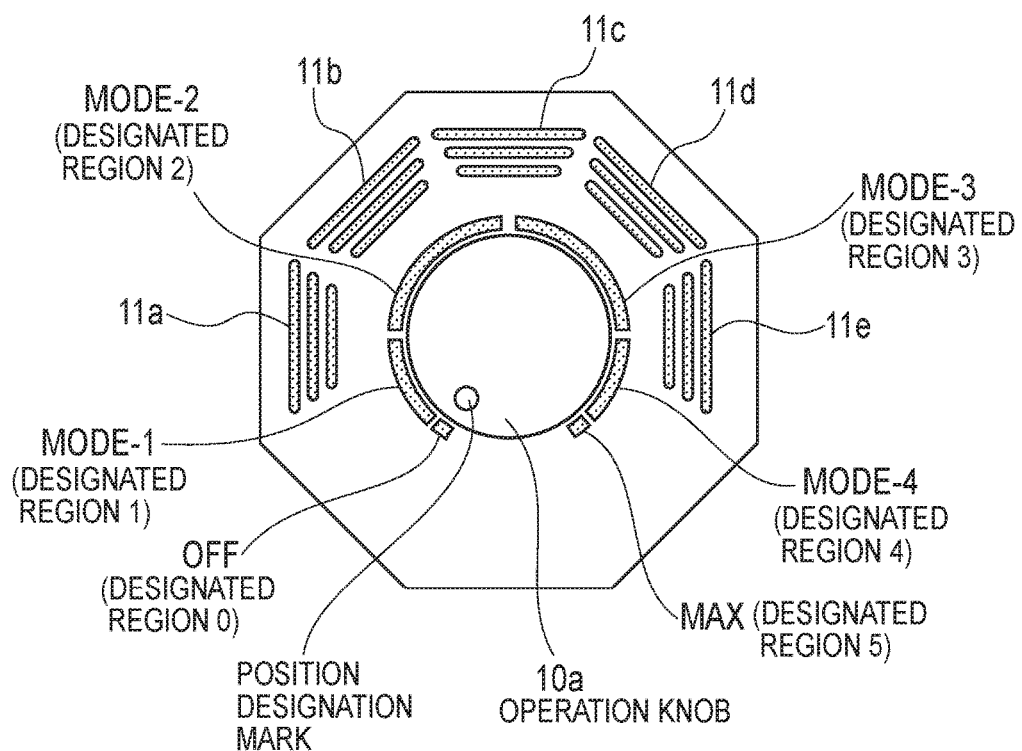
FIG. 1A is a diagram illustrating an external appearance of a reproducing device 100 according to an embodiment of the invention.
Figure 1B:
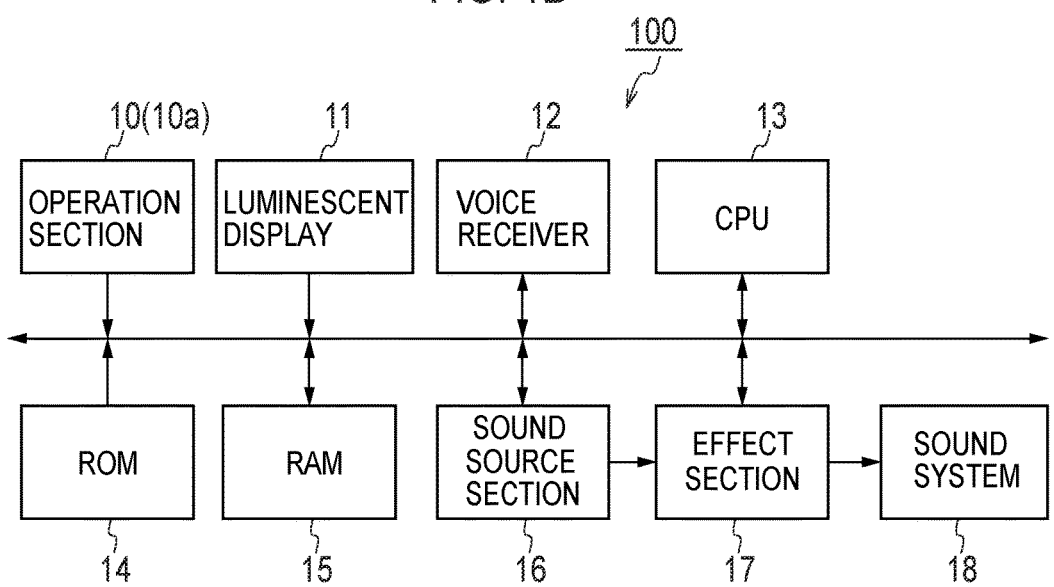
FIG. 1B is a block diagram illustrating an electrical configuration of the reproducing device 100.

The external appearance and the entire configurations of an embodiment will be described with reference to FIG. 1. FIG. 1A is a diagram illustrating the external appearance (upper surface) of a reproducing device 100 according to an embodiment of the invention. FIG. 1B is a block diagram illustrating the entire configurations of the reproducing device 100 according to an embodiment.

In FIG. 1, an operation section 10 is provided in a side portion of a housing for example, and includes a power switch (not illustrated) to turn on/off a device power and an operation knob 10a as the only main operator as illustrated in FIG. 1A. The operation knob 10a is an operator which freely rotates from an OFF region to a MAX value, and is configured by a rotary encoder volume for example, and generates an operation angle data according to a rotating operation.

Any region is designated among MODE-1 to MODE-4 and MAX by rotating the operation knob 10a. These regions are assigned with effects and optical performance patterns to be processed. Second sound data obtained by subjecting first sound data (material sound data; for example, music data) to an effect process is output in order to brighten up the mood of a certain place by rotating the operation knob 10a, and the optical performance pattern is output.

As for the region, a single effect process (for example, phaser) for a single piece of first sound data (material sound data; for example, music data) may be assigned, or a plurality of effect processes (for example, phaser and flanger) for the single piece of first sound data (material sound data; for example, music data) may be assigned.

In addition, as for the region, the plurality of effect processes (for example, phaser and flanger) for a plurality of pieces of first sound data (material sound data; for example, music data and built-in sound effect) may be assigned. For example, the effect process of phaser is performed on the music data, and the effect process of flanger is performed on the built-in sound effect.

A switch event occurring in the operation section 10 is input to a CPU 13 to be described. In addition, the operation angle data output by the operation knob 10a according to the rotating operation is input to the CPU 13, and is converted into data of a third byte of an MIDI control changing message as described below. In this embodiment, the data is called an operation value (0 to 127). In other words, the operation knob 10a generates an operation value (knob value) which is changed in a range from "0" to "127" according to an operation angle subjected to the rotating operation in an operation range from the OFF region to the MAX value.

In addition, in the operation knob 10a, there are defined operation regions MODE-1 to MODE-4 designated by a range of predetermined operation values and including the OFF region and the MAX value. Specifically, the operation value "0" to "5" is the OFF region, the operation value "6" to "24" is the operation region MODE-1, the operation value "25" to "63" is the operation region MODE-2, the operation value "64" to "103" is the operation region MODE-3, the operation value "104" to "126" is the operation region MODE-4, and the operation value "127" is the MAX value.

A luminescent display 11 includes luminescent bodies 11a to 11e disposed on the operation panel surface and a driver (not illustrated) which controls luminescent colors, brightness levels, or blinking states of the luminescent bodies 11a to 11e under the control of the CPU 13. The luminescent bodies 11a to 11e are configured by arranging luminescent bars, each of which includes a color LED. An external voice receiver 12 acquires user sampling sound data under the control of the CPU 13. The acquired user sampling sound data is stored in a RAM 15 by the CPU 13.

The CPU 13 reproduces "music data (the material sound data 1)", "built-in sound effect (the material sound data 2)", and "user sampling sound (the material sound data 3)" in a reproducing state previously assigned to a designated region (any of MODE-1 to MODE-4 and the MAX value) designated by a position designation mark. The designated regions of MODE-1 to MODE-4 correspond to a plurality of operation regions obtained by dividing a change range of a designation position by an operator. Marks indicating positions (region ranges) of the plurality of operation regions are imprinted or engraved in the surface of the operator to help a user who operates the operator to easily see the designation position in any operation region among the plurality of divided operation regions.

In addition, the CPU 13 controls the luminescent colors, the brightness levels, or the blinking states of the luminescent bodies 11a to 11e of the luminescent display 11 according to the optical performance pattern previously assigned to the designated region which is designated by the position designation mark. Further, a parameter value which is previously assigned to the designated region for every effect is set with reference to the parameter output characteristics of a plurality of predetermined effects. A plurality of effects to be generated according to the set parameter value is added to "music data (the material sound data 1)" to be reproduced. In other words, the plurality of effect processes is performed on the single piece of first sound data (the material sound data) to generate the second sound data for the output.

The plurality of effects generated according to the converted parameter value may be added to "music data (the material sound data 1)", "built-in sound effect (the material sound data 2)", and "user sampling sound (the material sound data 3)" which are to be reproduced. In other words, a plurality of pieces of second sound data for the output may be generated by performing the effect processes on the plurality of pieces of first sound data (the material sound data). In other words, the CPU 13 sets the parameter values of the plurality of effect processes at one operation, and a specific operation about such content of the invention will be described below.

A ROM 14 stores various types of control programs and control data loaded in the CPU 13. The various types of control programs include a main routine described below and an effect process called from the main routine. The RAM 15 includes, as illustrated in FIG. 2B, a work region A1, a music data region A2, a built-in sound effect region A3, a user sampling sound region A4, an effect/parameter table ET, and a control parameter table CT.

The work region A1 of the RAM 15 temporarily stores various types of registers and flag data which are used by the CPU 13. The music data indicating pitches and sounding timing of musical notes composing music is stored in the music data region A2 of the RAM 15. In the built-in sound effect region A3 of the RAM 15, there is stored, for example, sound data obtained by sampling surrounding sounds and effect sounds. In the user sampling sound region A4 of the RAM 15, there is stored the user sampling sound data acquired by the external voice receiver 12.

Next, the content of the effect/parameter table ET stored in the RAM 15 will be described with reference to FIG. 2B. The effect/parameter table ET is a data table defining the parameter output characteristics of five types of effects EF1 to EF5, and receives the operation value (0 to 127) acquired from the output (the operation angle data) of the operation knob 10a and outputs the parameter values to be supplied to the respective effects EF1 to EF5.

Figure 2A:
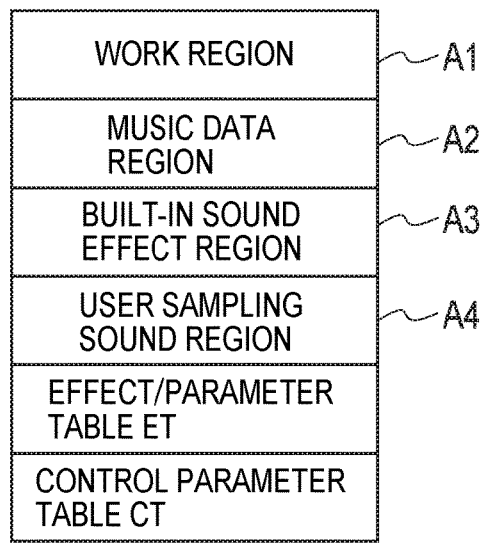
FIG. 2A is a diagram illustrating a memory map of a data structure of a RAM 15.
Figure 2B:
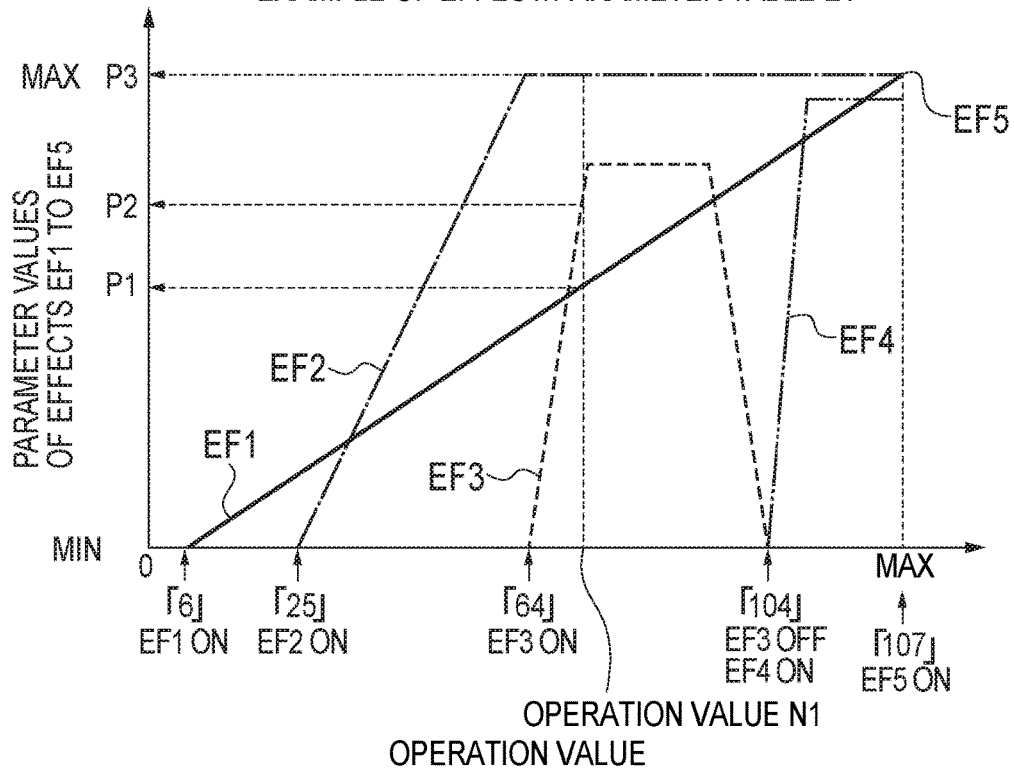
FIG. 2B is a diagram illustrating an example of an effect/parameter table ET.

For example, in a case where the operation value is "N1", as illustrated in FIG. 2B, the parameter value of the effect EF1 is "P1", the parameter value of the effect EF2 is "P3 (MAX)", and the parameter value of the effect EF3 is "P2". In this case, the effects EF4 and EF5 are not activated, and kept in an OFF state.

Further, in this embodiment, the effect EF1 is "phases", the effect EF2 is "flanger", the effect EF3 is "delay", the effect EF4 is "filter", and the effect EF5 is "bit crusher". In addition, the parameter values assigned to these effects EF1 to EF5 indicate "strength" or "depth" of a target effect.

Next, the content of the control parameter table CT stored in the RAM 15 will be described with reference to FIG. 3. In the control parameter table CT, there are designated the reproducing states of "music data", "built-in sound effect", and "user sampling sound" of the OFF region, the operation regions MODE-1 to MODE-4, and the MAX value, and also the optical performance pattern (the luminescent colors, the brightness levels, or the blinking states) of the luminescent bodies 11a to 11e of the luminescent display 11.

For example, in a case of MODE-1 region where the operation value is "6" to "24" in the control parameter table CT, 1 phrase loop reproduction of the music data stored in the RAM 15 is commanded, a random reproduction of the built-in sound effect (the surrounding sounds, the effect sounds, and the like) stored in the RAM 15 is commanded, a loop reproduction of a certain length of the user sampling sound stored in the RAM 15 is commanded, and an optical performance of the luminescent display 11 in synchronization with the reproduction of the music data is commanded.

A sound source section 16 has a function of reproducing "built-in sound effect" or "user sampling sound" stored in the RAM 15 in cooperation with the CPU 13 and a function of reproducing the music data (waveform data) which is configured by a well-known waveform memory read-out system. In an effect section 17 configured by a DSP, a plurality of types of effects generated according to the plurality of parameters acquired by the CPU 13 according to the operation values is added to the output of the sound source section 16. A sound system 18 performs a DA conversion to convert the output data of the effect section 17 into an output signal of an analog format and output the signal.

B. Operations

Next, the description will be given about the main routine performed by the CPU 13 and the operations of the effect process called from the main routine with reference to FIGS. 4 and 5.

(1) Operations of Main Routine

Figure 4:
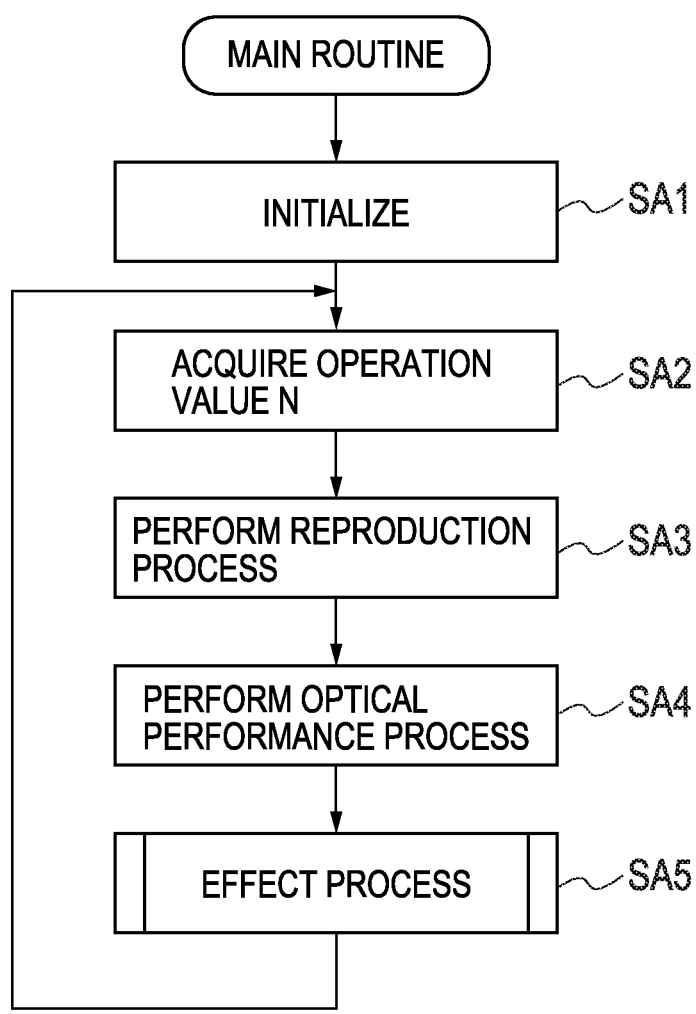
FIG. 4 is a flowchart illustrating operations of a main routine executed by a CPU 13.

FIG. 4 is a flowchart illustrating the operations of the main routine performed by the CPU 13. When the reproducing device 100 is powered on, the CPU 13 performs the main routine illustrated in FIG. 4 and proceeds to Step SA1. For example, an initialization is performed to initialize various types of registers and flag data which are set in the work region of the RAM 15.

Then, when proceeding to Step SA2, the CPU 13 converts the operation angle data output by the operation knob 10*a* into data of the third byte of the MIDI control changing message, and acquires this data as an operation value N. Next, when proceeding to Step SA3, the CPU 13 reproduces "music data", "built-in sound effect", and "user sampling sound" in the reproducing state corresponding to the regions (the OFF region, the operation regions MODE-1 to MODE-4, and the MAX value) including the operation value N from the control parameter table CT (see FIG. 3).

Specifically, for example, in a case where the operation value N acquired in Step SA2 is included in the operation region MODE-2 of "25" to "63", the sound source section 16 is commanded to perform a ½ phase loop reproduction of the music data stored in the RAM 15, the sound source section 16 is commanded to randomly reproduce the built-in sound effect (the surrounding sounds, the effect sounds, and the like) stored in the RAM 15, and the sound source section 16 is commanded to perform a loop reproduction of a certain length of the user sampling sound data stored in the RAM 15. Further, in a case where the operation value N is kept held to the operation region MODE-2 of "25" to "63", the reproducing state is repeated.

Then, in Step SA4, the CPU 13 controls, similarly to Step SA3, the luminescent colors, the brightness levels, or the blinking states of the luminescent bodies 11*a* to 11*e* of the luminescent display 11 disposed on the operation panel according to the optical performance pattern corresponding to the regions (the OFF region, the operation regions MODE-1 to MODE-4, and the MAX value) including the operation value N from the control parameter table CT (see FIG. 3).

Then, when proceeding to Step SA5, the CPU 13 performs conversion to the parameter values of the effects EF1 to EF5 corresponding to the regions (the OFF region, the operation regions MODE-1 to MODE-4, and the MAX value) including the operation value N from the effect/parameter table ET (see FIG. 2B), and adds the plurality of effects generated according to the converted parameter values to "music data", "built-in sound effect", and "user sampling sound" reproduced in Step SA3. Then, the CPU 13 repeatedly performs Steps SA2 to SA5 until the power of the reproducing device 100 is turned off.

(2) Operations of Effect Process

In the following, the description will be given about the operations of the effect process performed by the CPU 13 on an assumption of the output characteristics of five types of effects EF1 to EF5 defined in the effect/parameter table ET illustrated in FIG. 2B.

FIG. 5 is a flowchart illustrating the operations of the effect process performed by the CPU 13. When performing the process through Step SA5 of the main routine described above (see FIG. 4), the CPU 13 proceeds to Step SB1 illustrated in FIG. 5, and determines which one of the OFF region, the operation regions MODE-1 to MODE-4, and the MAX value includes the acquired operation value N.

Hereinafter, the operations will be described about cases where the acquired operation value N is "0" to "5" (the OFF region), "6" to "24" (the operation region MODE-1), "25" to "63" (the operation region MODE-2), "64" to "103" (the operation region MODE-3), "104" to "126" (the operation region MODE-4), and "127" (the MAX value).

(a) Operation Value N of "0" to "5" (OFF Region)

In this case, the CPU 13 proceeds to Step SB2, sets the respective parameter values of the effects EF1 to EF5 to zero, and ends the process.

(b) Operation Value N of "6" to "24" (Operation Region MODE-1)

In this case, the CPU 13 proceeds to Step SB3, and sets the effect EF1 to ON. In other words, the effecter which generates the effect EF1 (phaser) is activated, the CPU 13 proceeds to Step SB4 to generate the effect EF1 (phaser) with the parameter value EF1(N) obtained from the effect/parameter table ET, and ends the process. Further, the parameter value EF1(N) indicates a parameter value which is read out of the effect/parameter table ET (the output characteristic of the effect EF1) according to the operation value N.

(c) Operation Value N of "25" to "63" (Operation Region MODE-2)

In this case, the CPU 13 proceeds to Step SB4, generates the effect EF1 (phaser) with the parameter value EF1(N) obtained from the effect/parameter table ET, proceeds to Step SB5, activates the effecter which generates the effect EF2 (flanger), proceeds to Step SB6, generates the effect EF2 (flanger) with the parameter value EF2(N) obtained from the effect/parameter table ET, and ends the process.

(d) Operation Value N of "64" to "103" (Operation Region MODE-3)

In this case, the CPU 13 proceeds to Step SB4, generates the effect EF1 (phaser) with the parameter value EF1(N) obtained from the effect/parameter table ET, proceeds to Step SB6, and generates the effect EF2 (flanger) with the parameter value EF2(N) obtained from the effect/parameter table ET. Then, the CPU 13 proceeds to Step SB7 to activate the effecter which generates the effect EF3 (delay), proceeds to Step SB8 to generate the effect EF3 (delay) with the parameter value EF3(N) obtained from the effect/parameter table ET, and ends the process.

(e) Operation Value N of "104" to "126" (Operation Region MODE-4)

In this case, the CPU 13 proceeds to Step SB4, generates the effect EF1 (phaser) with the parameter value EF1(N) obtained from the effect/parameter table ET, proceeds to Step SB6, and generates the effect EF2 (flanger) with the parameter value EF2(N) obtained from the effect/parameter table ET.

Then, the CPU 13 proceeds to Step SB8, and generates the effect EF3 (delay) with the parameter value EF3(N) obtained from the effect/parameter table ET. Then, the CPU 13 proceeds to Step SB9, sets the effect EF3 (delay) to OFF to stop the effecter which generates the effect EF3 (delay), and activates the effecter which generates the effect EF4 (filter). Thereafter, the CPU 13 proceeds to Step SB10, and generates the effect EF4 (filter) with the parameter value EF4(N) obtained from the effect/parameter table ET.

(f) Operation Value N of "127" (MAX Value)

In this case, the CPU 13 proceeds to Step SB4, generates the effect EF1 (phaser) with the parameter value EF1(N) obtained from the effect/parameter table ET, proceeds to Step SB6, and generates the effect EF2 (flanger) with the parameter value EF2(N) obtained from the effect/parameter table ET.

Then, the CPU 13 proceeds to Step SB8, and generates the effect EF3 (delay) with the parameter value EF3(N) obtained from the effect/parameter table ET. Then, the CPU 13 proceeds to Step SB10, and generates the effect EF4 (filter) with the parameter value EF4(N) obtained from the effect/parameter table ET. Thereafter, the CPU 13 proceeds to Step SB11, activates the effecter which generates the effect EF5 (bit crusher), generates the effect EF5 (bit crusher) with the parameter value EF5(N) obtained from the effect/parameter table ET in the following Step SB12, and ends the process.

As described above, in this embodiment, the operation value is acquired according to a position designated by the operation of the operation knob 10a, the parameter value in the effect process set in the designated region corresponding to the designated position is set to a value according to the operation value, and the second sound data obtained by subjecting the first sound data to the effect process set in the designated region according to the set parameter value is output, so that it is possible to control the parameters of the plurality of effect processes by one operation.

Further, in the above embodiment, the luminescent colors, the brightness levels, or the blinking states of the luminescent bodies 11a to 11e of the luminescent display 11 are controlled according to the optical performance pattern previously assigned to the operation region where the operation value is included. However, the invention is not limited to the above configuration and, for example, the luminescent colors, the brightness levels, or the blinking states of the luminescent bodies 11a to 11e of the luminescent display 11 may be controlled according to the converted parameter value. With the configuration, the optical performance may be performed in accordance with "mood" of the user.

Further, in this embodiment, the plurality of parameters are generated using the operation value acquired from the output (the operation angle data) of the operation knob 10a, but the invention is not limited thereto. A volume, pitch, tone, and the like of a reproduced sound may be controlled in accordance with "mood" of the user by extracting an angular speed or an angular acceleration of the rotation of the operation knob. With such a configuration, the parameters of the plurality of effect processes can be controlled in parallel by one operation.

In addition, the embodiment has been described about that the main operator is the rotational operation knob 10a, but there is no need to use the rotational operation knob 10a as the main operator. A sliding operator may be used which designates a position by being slid right and left or up and down.

In addition, the above embodiment has been described about the reproducing device which controls the reproduction of the music data according to the operation of the operator, but the invention is not limited to the reproducing device. The invention may be applied to an operation processing device which performs various processes by setting various types of execution conditions according to the operation of the operator.

Hitherto, while having been described about the embodiments, the invention is not limited to these embodiments. Various modifications can be made at the execution stages in a scope not departing from the spirit. In addition, the functions performed in the embodiments may be appropriately combined. Various stages are included in the embodiments, and various inventions may be derived by appropriately combining a plurality of components disclosed above. For example, even if some components are removed from the entire components disclosed in the embodiments, the configuration obtained by removing the components may be derived as an invention as long as the effects can be achieved.

In addition, in the above embodiments, the controller to perform various types of controls is configured such that the CPU (general purpose processor) executes a program stored in the ROM (memory). A plurality of controls may be divided into dedicated processors. In this case, each of the dedicated processors may be configured by a general purpose processor (electronic circuit) which can execute any program and a memory which stores a control program specified to each control. Alternatively, the processor may be configured by a dedicated electronic circuit which is specified to each control.

In addition, a device necessary to achieve various effects described above is not limited to the above configurations and, for example, may be configured as follows.

(Configuration 1)

A device is configured to comprise:

an operator which is capable of operating of changing a designation position and outputs an operation value corresponding to the designation position; and a processor which determines each of a plurality of execution conditions corresponding to each of a plurality of processes according to the operation value output by the operator and controls execution of the plurality of processes on the basis of the determined execution conditions, wherein the processor performs the determination on the basis of a correspondence relation between the operation value and the execution condition which is defined to be individually different in each of the plurality of processes.

(Configuration 2)

The device is further configured, in the above configuration example, such that the execution condition includes a parameter value which is set when a process is performed, and that the processor determines parameter values corresponding to each of a plurality of processes according to the operation value output by the operator on the basis of a correspondence relation between the operation value and the parameter value which is individually defined in each process, and sets each of the determined parameter values to control such that each process is performed.

(Configuration 3)

The device is further configured, in any one of the above configuration examples, such that the correspondence relation between the operation value and the parameter value is defined within an operation region which is set in a range where the designation position is changed and is individually set in each process, and that the processor specifies an operation region in which the operation value output by the operator corresponds to a process, determines a parameter value on the basis of the correspondence relation defined in correspondence with the specified operation region, and sets the determined parameter value to control such that a process corresponding to the specified operation region is executed.

(Configuration 4)

The device is further configured, in any one of the above configuration examples, such that the operator is capable of operating of continuously changing the designation position, and continuously changes an operation value which is output according to the continuous change of the designation position, and that the correspondence relation between the operation value and the parameter value is defined as a continuous change of the parameter value according to the change of the operation value within an operation region set as a partial region which is continuous within a continuous change range of the designation position.

(Configuration 5)

The device is further configured, in any one of the above configuration examples, such that the processor determines whether the operation value output by the operator is in an operation region corresponding to each process, and controls such that a process corresponding to the operation region determined as having the operation value is selected and performed among the plurality of processes.

(Configuration 6)

The device is further configured, in any one of the above configuration examples, such that a plurality of operation regions set in correspondence with the plurality of processes is overlapped to each other within a change range of the designation position, and that, in a case where it is determined that the operation value output by the operator falls within the plurality of operation regions, the processor controls such that the plurality of processes corresponding to the plurality of operation regions are performed.

(Configuration 7)

The device is further configured, in any one of the above configuration examples, such that an effect process is included in the plurality of processes, and wherein the processor outputs second sound data which is obtained by subjecting first sound data to the effect process in which the determined parameter value is set.

(Configuration 8)

The device is further configured, in any one of the above configuration examples, such that the processor outputs the second sound data which is obtained by subjecting the first sound data to an effect process which is set to the specified operation region, among a plurality of different effect processes which are set in correspondence with each of the plurality of operation regions, according to an parameter value determined on the basis of the correspondence relation corresponding to the specified operation region.

(Configuration 9)

The device is further configured, in any one of the above configuration examples, such that the processor outputs the second sound data which is obtained by subjecting the first sound data to the plurality of effect processes corresponding to the specified operation region at the same time.

(Configuration 10)

The device is further configured, in any one of the above configuration examples, such that the operator is capable of rotating to continuously change a designation angle, and continuously changes an operation value which is output according to the continuous change of the designation angle, and that the correspondence relation between the operation value and the parameter value is defined as a continuous change of the parameter value according to the change of the operation value within an operation region set as a partial region which is continuous within a continuous change range of the designation angle.

(Configuration 11)

The device is further configured, in any one of the above configuration examples, such that an optical performance process is included in the plurality of processes, and that the processor controls such that the optical performance process according to an optical performance pattern which is set in the specified operation region is performed.

(Configuration 12)

The device is further configured, in any one of the above configuration examples, such that a mark is displayed in a surface of the operator to indicate a position of each of the plurality of operation regions.

(Configuration 13)

The device is further configured, in any one of the above configuration examples, such that the device comprises
the operation processing device according to claim 1;
a sound source section which reproduces music data; and
an effect section which adds an effect to an output of the sound source section, and
that the processor controls the effect section to add an effect to which a parameter value determined according to an operation of the operator is set.

The invention claimed is:

1. A sound control device, comprising:
an operator configured to output an operation value, and to change the operation value according to a change of a designated position of the operator by a user operation; and
a processor configured to give multiple types of sound effects including at least a first type of sound effect and a second type of sound effect different from the first type of sound effect to output sound, and to simultaneously change an amount of the first type of sound effect and an amount of the second type of sound effect according to the change of the operation value based on first information that separately defines a change in the amount of the first type of sound effect and a change in the amount of the second type of sound effect corresponding to the change of the operation value.

2. The sound control device according to the claim 1, wherein:
the first information includes information that separately defines a first range and a second range among a range of the change of the operation value which the operator outputs according to the user operation, the first range changing the amount of the first type of sound effect according to the change of the operation value, and the second range changing the amount of the second type of sound effect according to the change of the operation value; and
the processor is configured (i) not to give the first type of sound effect when the operation value is out of the first range, (ii) to give the first type of sound effect when the operation value is within the first range, (iii) to change the amount of the first type of sound effect according to the change of the operation value, (iv) not to give the second type of sound effect when the operation value is out of the second range, (v) to give the second type of sound effect when the operation value is within the second range, and (vi) to change the amount of the second type of sound effect according to the change of the operation value.

3. The sound control device according to the claim 1, wherein:
the first information separately defines a change of strength or depth of the first type of sound effect corresponding to the change of the operation value and a change of strength or depth of the second type of sound effect corresponding to the change of the operation value; and
the processor controls to simultaneously change the strength or depth of the first type of sound effect according to the change of the operation value and the strength or depth of the second type of sound effect according to the change of the operation value based on the first information.

4. The sound control device according to the claim 1, wherein:
the processor further reproduces sound data in a reproducing state designated from multiple reproducing states, and simultaneously changes the sound effect and the reproducing state according to the change of the operation value based on the first information and second information that defines a change of the reproducing state corresponding to the change of the operation value.

5. The sound control device according to the claim 4, wherein:
the processor further simultaneously reproduces multiple sound data including at least first sound data and second sound data;
the second information separately defines a change of a reproducing state of the first sound data and a change of a reproducing state of the second sound data corresponding to the change of the operation value; and
the processor simultaneously changes the reproducing state of the first sound data and the reproducing state of the second sound data according to the change of the operation value based on the second information.

6. The sound control device according to the claim 4, wherein:
the processor simultaneously changes the reproducing state of the first sound data, the reproducing state of the second sound data, a sound effect corresponding to a reproduced sound of the first sound data, and a sound effect corresponding to a reproduced sound of the second sound data, based on the first information and the second information.

7. The sound control device according to the claim 4, wherein:
a range of the change of the operation value is dived into multiple ranges; and
the reproducing state or the sound effect is defined per the divided ranges.

8. The sound control device according to the claim 1, wherein:
the processor further makes a luminescent display illumine according to an optical performance pattern designated from multiple optical performance patterns; and the processor simultaneously changes the sound effect and the optical performance pattern according to the change of the operation value based on the first information and a third information that defines a change of the optical performance pattern corresponding to the change of the operation value.

9. The sound control device according to the claim 4, wherein the multiple reproducing states include at least any of multiple loop reproductions having different loop ranges and a random reproduction.

10. The sound control device according to the claim 5, wherein the multiple sound data include at least any of music data, built-in sound effect, and user sampling sound.

11. The sound control device according to the claim 1, wherein:
the operator is capable of rotating or sliding continuously; and
the operator continuously changes the operation value which is output according to the continuous rotation or sliding of the operator.

12. A sound control method, comprising:
outputting an operation value, and changing the operation value according to a change of a designated position of an operator by a user operation; and
giving multiple types of sound effects including at least a first type of sound effect and a second type of sound effect different from the first type of sound effect to output sound, and simultaneously changing an amount of the first type of sound effect and an amount of the second type of sound effect according to the change of the operation value based on first information that separately defines a change in the amount of the first type of sound effect and a change in the amount of the second type of sound effect corresponding to the change of the operation value.

13. A non-transitory recording medium recording a program readable by a computer of a sound control device, the program causing a processor of the sound control device to execute:
a process of outputting an operation value, and changing the operation value according to a change of a designated position of an operator by a user operation; and
a process of giving multiple types of sound effects including at least a first type of sound effect and a second type of sound effect different from the first type of sound effect to output sound, and simultaneously changing an amount of the first type of sound effect and an amount of the second type of sound effect according to the change of the operation value based on first information that separately defines a change in the amount of the first type of sound effect and a change in the amount of the second type of sound effect corresponding to the change of the operation value.

* * * * *